May 17, 1960 G. A. FRANCO 2,937,273

DETECTORS

Filed Oct. 31, 1957 2 Sheets-Sheet 1

INVENTOR.
GEORGE A. FRANCO

BY T. L. Styner
ATTORNEY

May 17, 1960 G. A. FRANCO 2,937,273

DETECTORS

Filed Oct. 31, 1957 2 Sheets-Sheet 2

United States Patent Office 2,937,273

Patented May 17, 1960

2,937,273

DETECTORS

George A. Franco, Pittsford, N.Y., assignor to General Dynamics Corporation, Rochester, N.Y., a corporation of Delaware Application October 31, 1957, Serial No. 693,638

4 Claims. (Cl. 250—27)

This invention relates to detectors and, particularly, is directed to detectors for reliably distinguishing signals in a high voltage noise background.

Intelligence intended for electrical transmission to a distant point must always contend with extraneous voltages, generally classified as noise. The narrower the signal band, the narrower may be the noise band. The limit to which a signal band can be reduced is a single-frequency component, which theoretically represents the most favorable signal in a noise background of a given level. Unfortunately, when the transmitting media is radio, noise voltages often become greater than the signal voltage, and ordinary selective filter techniques fail.

An amplitude modulated wave of carrier or intermediate frequency may be analyzed, when examined in detail, as a series of positive and negative sinusoidal loops the amplitudes of which are nearly constant. Amplitudes do, however, vary slightly from loop to loop to accommodate the low frequency signal modulations. This is true even though the modulation frequencies, per se, may be composed of a complex assortment of harmonics or overtones. That is, if each crest of the carrier wave is separately examined, and the voltage amplitudes there found are integrated, the signal can be reproduced. Fortunately, the addition or subtraction of noise spikes to the crests average to zero over a sufficient period of time, even though the measured noise may be 12 to 15 db above the carrier, according to this invention.

An object of this invention is to provide improved means of detecting the modulations on a carrier or intermediate frequency wave; a more specific object being to provide improved detectors for signals in an unfavorable noise background.

Another signal contemplated here is of the pulse or telegraphic type in which the so-called "mark" and/or "space" portions of the signal is characterized by an undulatory voltage wave of fixed frequency and usually of fixed amplitude throughout the duration of the mark or space period. A voltage of one frequency can be employed for, say, the mark, and a voltage of another frequency, or no voltage at all, can be employed for the space. This type of signal is usually produced by so-called "frequency shift keying." In addition to the more obvious teletype uses, frequency shift keying can be employed in facsimile, video, remote control servos, call systems, and the like.

Accordingly, another object of this invention is to provide means for reliably detecting the mark and/or space frequencies of a signaling system when the average noise level may be greater than the amplitude of the signal.

The objects of this invention are attained by sampling the received signal wave during each excursion or loop of the wave and then integrating and filtering the samples. The amplitude of noise voltages occurring at the successive instances of sampling averages to zero and when no signal is present, the resultant output voltage of the receiver is zero. By sampling each succeeding loop at a progressively different place or phase position, when frequency-shift-keying signals are received, the integrated samples will result in a voltage wave of a frequency corresponding to the phase velocity of the sampling rate with respect to the signal frequency.

Other objects and features of this invention will become apparent by referring to the specific embodiments described in the following specification and shown in the accompanying drawings in which.

Figure 1:
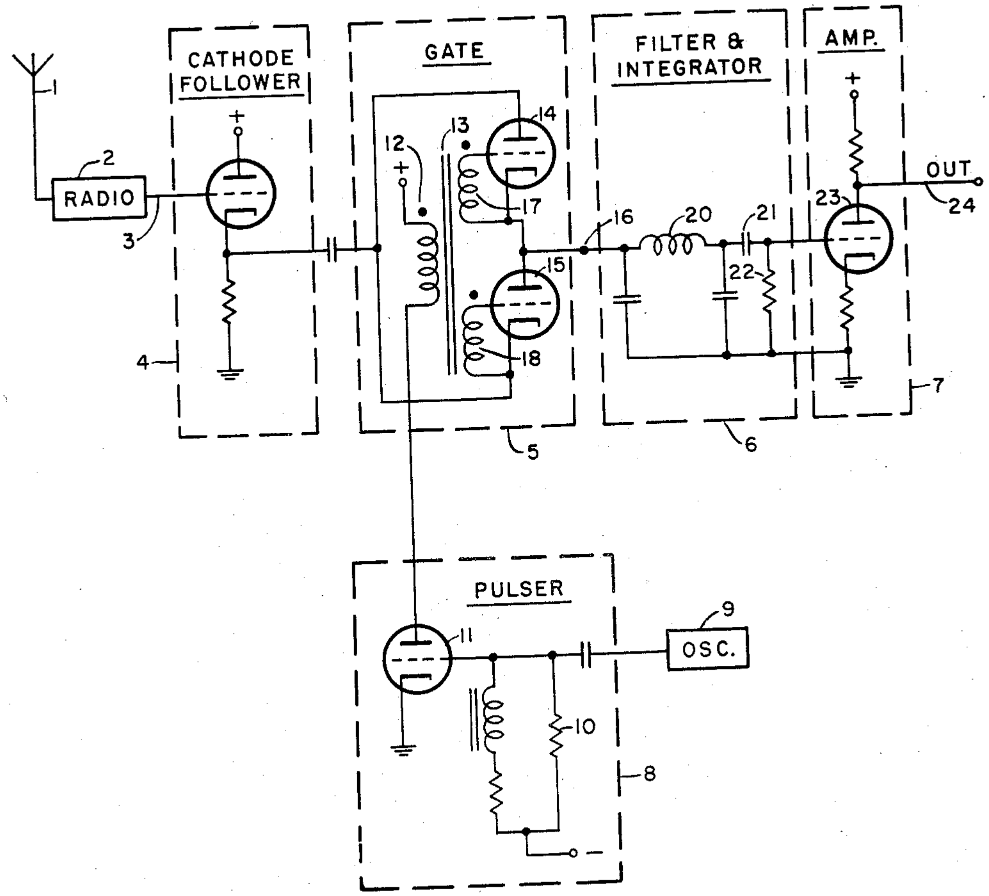
Figure 1 shows a schematic circuit of one embodiment of this invention.

Let it be assumed that the signal to be received is modulated on a carrier, radiated from a distant transmitter, and received at antenna 1 and radio receiver 2, Figure 1, so that the signal is burdened with the usual atmospheric noises as well as the intra-circuit noises of the transmitter and receiver. For simplicity, let it be further assumed that the signal content comprises a single known carrier frequency which may be keyed on and off and properly encoded with marks and spaces to contain meaningful intelligence. Usually, the receiver 2 should contain one or more heterodyning stages to produce an intermediate frequency at the output 3 of the radio receiver modulated still with the encoded signal. For example, a carrier keyed on and off might, after heterodyning, produce an intermediate frequency, IF of 454,500 cycles per second, and if both active mark and space signals are desired, IF's of 455,500 cycles per second as well as 454,500 cycles per second could be provided, with narrow pass 455,000 cycles per second IF amplifiers.

In Figure 1, the modulated signal is preferably first applied to an isolating cathode follower stage 4, and hence, to the gate 5, then to the filter and integrator 6, and finally to the output amplifier 7. Into the gate is also fed a series of locally generated pulses from the pulser 8 controlled by the local oscillator 9. The pulses from pulser 8 are of short duration compared to their duty cycle and, as will more fully hereinafter appear, are of a repetition rate slightly different from the carrier, or IF, frequency passed by cathode follower 4. If the output frequency at 3 is $(IF+dF+N)$ representing the intermediate frequency chosen for the radio 2, the signal frequency $dF$, and the noise voltages N, the local oscillator 9 should be adjusted to a frequency equal to $(IF+dF+W_x)$. The frequency $W_x$, is the difference between the locally generated pulse frequency and the incoming signal, $IF+dF$.

The pulser may be self-regulating in frequency or may be controlled by a separate source. In Figure 1, the locally generated waves, more or less sinusoidal, are produced by the oscillator 9, preferably crystal controlled, and by means of the differentiating grid circuit of tube 11, pulses of the desired short duration are formed and are applied to the primary 12 of the transformer 13 in the gate circuit.

The gate, in the specific example shown in Figure 1, comprises a full-wave rectifier adapted to be normally biased off, or closed, and to be opened only during the application of the short-duration pulses mentioned above. Triodes 14 and 15 are oppositely polarized with respect to the output signal lead 16 so that only positive signal pulses may pass tube 14 and only negative signal pulses may pass tube 15. The grid-cathode circuit of each triode is completed through secondary windings 17 and 18 of transformer 13 and each winding is so polarized that the two grids are pulsed in phase in response to a pulse from pulser 8. That is, both triodes of the double gate are normally closed and are both simultaneously opened by the pulser and will pass either positive or negative going signals appearing at the output of the cathode follower 4. Transistors could be substituted for the triodes.

The output circuit 16 of the gate is coupled through the filter 20 comprising, in the example shown, a single pi section of inductance and parallel capacitance. More sections, of course, may be used and are preferably adjusted to pass only a narrow band of frequencies immediately surrounding the difference frequency $W_x$. Adjacent the filter is the integrator comprising condenser 21 and resistor 22 coupled in the input circuit of amplifier 7. The amplifier shown is the conventional anode-loaded triode 23 with the output 24 connected to the anode.

Figure 3:
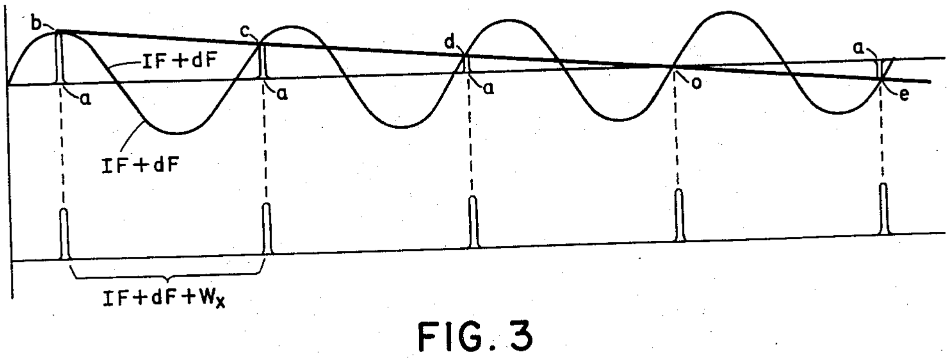
Figure 3 is a waveform diagram showing important voltages of the system of Figures 1 and 2.

The operation of the circuits of Figure 1 may best be understood by referring to the voltage diagrams of Figure 3 where the input signal $IF+dF$ is applied to the gate in parallel with the two triodes 14 and 16. The locally generated pulses which differ in frequency from the input signal by the amount $W_x$ is applied to the two grids. Since the pulse and signal frequencies are different, the instant of opening of the gate shifts timewise during the successive undulations of the signal wave. The phase velocity of the pulse with respect to the signal wave will, of course, depend upon the frequency difference $W_x$. In Figure 3, the first pulse is assumed to occur at the instant of maximum positive signal excursion so that the amplitude of the gated voltage is *a—b* on the diagram. If the pulse repetition rate is higher, say, than the signal frequency, the next pulse will open the gate at a slightly lower signal voltage, *a—c*. During the next excursion, the signal voltage that is gated will be *a—d*, and finally the signal will be zero on the fourth pulse, in the assumed example, and will proceed to the negative value represented by *a—e*. As the signal voltage becomes negative at tthe instant of gating, the output at 16 becomes negative, and by the integrating action of the filter and CR circuit 21—22, the output voltage *b—c—d—o—e*, Figure 3, shifts from positive to negative.

An important feature of this invention is that the random noise voltages occurring at the instant the gate is opened, will add to or substract from the signal voltages *a—b*, *a—c*, *a—d*, and *a—e*, but over a period of time, the random noise pulses average to zero without impairing the fidelity of the system to reproduce at the output a current representative of the wanted signal.

Figure 2:
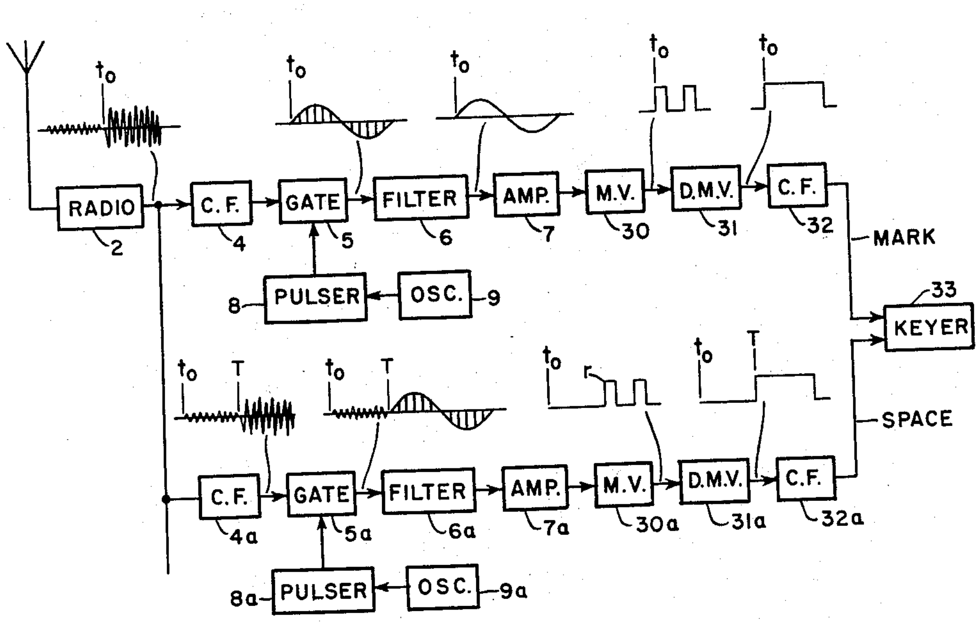
Figure 2 is a block diagram of a more comprehensive system embodying this invention.

In Figure 2 is shown a system for detecting two or more signal frequencies characteristic of typical frequency-shift keyed teletype receivers. The channels of Figure 1 are repeated, each comprising the cathode follower 4, gate 5, filter 6, amplifier 7, and pulser 8 with controlling oscillator 9. The second channel has the same components 4a, 5a, 6a, 7a, 8a and 9a, the frequency parameters of each channel being chosen to selectively receive one signal frequency. If local oscillator 9 is adjusted, for example, to $IF+(dF+W_x)$, the next local oscillator 9a would be adjusted to frequency $IF-(dF+W_x)$.

The output of each sampling network is passed through amplifier 7 and fed to a squaring circuit, such as a Schmitt-type multivibrator 30, and hence, to the delay multivibrator 31 of a period equal to that of $W_x$. The resultant square pulse may then be fed to the cathode follower-inverter 32 in each channel and, hence, to the keying circuit 33. The keying circuit could, if desired, operate a conventional teletypewriter. The two frequencies $IF+dF$ and $IF-dF$ would represent the mark and space frequencies of the teletype system, the beginning of the mark and space intervals being indicated, respectively, at $t_0$ and T, Figure 3. The output of each amplifier 7 may be used in a frequency comparer circuit to activate an automatic frequency control system, if desired. If three or more components are to be received and detected, a third, fourth or additional channels would be paralleled in the output of the radio receiver 2.

Consider now a carrier amplitude modulated with, say, voice frequencies. The filter 6 of the receiver of Figure 1 would be of the low pass type and would be designed to pass the desired band of voice frequencies of, say, 0 to 2000 cycles per second. The pulse repetition rate of pulser 8 and oscillator 9 would be adjusted to zero beat with the carrier, or the IF, at point 3. Synchronization of the local oscillator with carrier may be effected in any of a number of ways, and manual or automatic means should be provided for selecting the precise desired point on the carrier loops when the gate shall be opened. The output at 24 will comprise a direct current varying in amplitude in exact sympathy with the envelope of the modulated carrier.

Many specific circuit components may be selected from the prior art and employed in the system of this invention without departing from the scope of the invention as defined in the appended claims.

What is claimed is:

1. A system for detecting a signal composed of a carrier of known frequency modulated with intelligence-bearing information and accompanied with relatively strong random noise voltages, said system comprising a source of modulated carrier with noise, a gate, said gate having an input circuit connected to said source and an output circuit, said gate being normally closed to all voltages and having a control circuit for opening said gate, a source of pulses connected to said control circuit for regularly opening said gate for periods of time relatively short compared to the period of said known frequency to regularly sample the carrier and noise voltage, the pulse source being adjusted to a frequency different than said known frequency, a filter circuit connected to the output circuit of said gate, said filter being adjusted to selectively pass frequency components equal to the difference in frequency between said known source and said pulse source, and means for integrating the voltages passed by said filter to produce a smoothly variable signal voltage.

2. A system for distinguishing intelligence-bearing signal components of a received carrier obscured in a relatively strong noise background, said system comprising a gate having a control circuit and adapted to receive the signal-modulated carrier, a filter coupled to the output of said gate, a pulse source, said source being coupled to said control circuit of said gate for periodically opening said gate to pass narrow samples of the modulated carrier and noise voltages to said filter, said pulse source being adjusted to a frequency different than said carrier frequency and said filter being adjusted to selectively pass components corresponding in frequency to the difference in frequency between said pulse source and said carrier, and means coupled to the filter output for integrating the components passed by said filter.

3. A system for recovering frequency-shift keying signals on a carrier of radio or intermediate frequency obscured in a noise background, said system comprising a gate coupled between the source of signal-modulated carrier and a utilization circuit, said gate having a control circuit, a pulse generator coupled to said control circuit for periodically opening said gate and sampling said signal-modulated carrier, the period of the pulses of said generator being different than the period of said carrier by amount $W_x$, and the duration of the pulses of said generator being small compared to the period of said pulses, and a band pass filter having a pass band centered at a frequency corresponding to $W_x$, said filter being coupled between the output circuit of said gate and said utilization circuit.

4. A system for detecting undulatory waves of predetermined frequency, IF, carrying intelligence modulations, *dF*, and obscured in noise voltages, N, said system comprising a gate with an input circuit coupled to the source of said waves and with a control circuit for selectively passing samples of said wave to the output circuit of the gate, said passed wave being composed of $IF+dF+N$, a pulse generator, the pulses of said generator having a repetitive rate corresponding to $IF+dF+W_x$, where $W_x$ is the difference between the locally generated pulse frequency and the incoming signal $IF+dF$, the duration of the pulses of said pulse generator being short compared to the duty cycle of said pulse generator, and a band pass filter having a pass band centered at a frequency corresponding to $W_x$.

References Cited in the file of this patent

UNITED STATES PATENTS

| | | |
|---|---|---|
| 2,335,265 | Dodington | Nov. 30, 1943 |
| 2,471,418 | Earp | May 31, 1949 |
| 2,532,338 | Schlesinger | Dec. 5, 1950 |
| 2,767,258 | Sanders | Oct. 16, 1956 |
| 2,790,898 | Brady | Apr. 30, 1957 |